United States Patent
Zhou et al.

(10) Patent No.: US 11,395,236 B2
(45) Date of Patent: Jul. 19, 2022

(54) PATH LOSS REFERENCE SIGNAL READY TIME FOR A DOWNLINK CONTROL INFORMATION BASED ACTIVATION COMMAND

(71) Applicant: QUALCOMM Incorporated, San Diego, CA (US)

(72) Inventors: Yan Zhou, San Diego, CA (US); Tao Luo, San Diego, CA (US); Qian Zhang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/115,421

(22) Filed: Dec. 8, 2020

(65) Prior Publication Data

US 2021/0185618 A1 Jun. 17, 2021

Related U.S. Application Data

(60) Provisional application No. 62/948,061, filed on Dec. 13, 2019.

(51) Int. Cl.
*H04W 52/24* (2009.01)
*H04W 72/04* (2009.01)
*H04L 5/00* (2006.01)
*H04W 52/54* (2009.01)

(52) U.S. Cl.
CPC ......... *H04W 52/242* (2013.01); *H04L 5/0051* (2013.01); *H04L 5/0055* (2013.01); *H04W 52/54* (2013.01); *H04W 72/042* (2013.01)

(58) Field of Classification Search
CPC ........... H04W 52/00–60; H04W 52/54; H04W 52/242; H04W 72/042; H04L 5/0051; H04L 5/0055
See application file for complete search history.

(56) References Cited

U.S. PATENT DOCUMENTS

2017/0289899 A1* 10/2017 You ........................ H04W 88/08
2017/0359765 A1* 12/2017 Chincholi ............... H04L 43/16
2019/0155385 A1* 5/2019 Lim ........................ G06F 3/033
2019/0312668 A1 10/2019 Park et al.
2020/0029335 A1* 1/2020 Yang .................... H04W 52/242
(Continued)

FOREIGN PATENT DOCUMENTS

WO WO-2018232245 A1 12/2018

OTHER PUBLICATIONS

3GPP TSG-RAN WG4 RAN#93, R4-1914980 (Year: 2019).*
(Continued)

*Primary Examiner* — Raymond S Dean
(74) *Attorney, Agent, or Firm* — Harrity & Harrity, LLP

(57) ABSTRACT

Various aspects of the present disclosure generally relate to wireless communication. In some aspects, a user equipment (UE) may determine a path loss reference signal (PLRS) ready time that indicates an interval after which a PLRS is to be ready for use in performing an uplink power control operation, wherein the PLRS is activated by a downlink control information (DCI) based PLRS activation command; and perform the uplink power control operation, based at least in part on the PLRS, after the PLRS ready time. Numerous other aspects are provided.

30 Claims, 9 Drawing Sheets

(56) References Cited

U.S. PATENT DOCUMENTS

2020/0068497 A1* 2/2020 Gong ............... H04W 52/146

OTHER PUBLICATIONS

Apple Inc: "Remaining Issues on Multi-Beam Operation", 3GPP Draft, R1-1912824, 3GPP TSG-RAN WG1 #99, 3rd Generation Partnership Project (3GPP), Mobile Competence Centre, 650 Route Des Lucioles, F-06921, Sophia-Antipolis Cedex, France, vol. RAN WG1, No. Reno, USA, Nov. 18-Nov. 22, 2019, Nov. 9, 2019 (Nov. 9, 2019), XP051823624, 14 Pages, Retrieved from the Internet: URL:https://ftp.3gpp.org/tsg_ran/WG1_RL1/TSGR1_99/Docs/R1-1912824.zip, R1-1912824 Remaining Issues on Multi-Beam Operation. docx [retrieved on Nov. 9, 2019] Section 1 Section 3, pp. 1-6, 1 Introduction pp. 6-10, 2 Overhead and LatencyReduction p. 13, 4.3 Clarification of Measurement Restriction, p. 9. line 17-line 28; figures 2-3.
International Search Report and Written Opinion—PCT/US2020/070887—ISA/EPO—Mar. 22, 2021.
Qualcomm: "Applicable Timing for Pathloss RS Activated/Updated by MAC-CE," 3GPP Draft, 3GPP TSG-RAN WG4 RAN4#93, R4-1914980, 3rd Generation Partnership Project (3GPP), Mobile Competence Centre, 650, Route Des Lucioles, F-06921, Sophia-Antipolis Cedex, France, vol. RAN WG4. No. Reno, Nevada, Nov. 18-Nov. 22, 20192, Nov. 8, 2019 (Nov. 8, 2019), XP051819259, 4 pages, Retrieved from the Internet: URL:https://ftp.3gpp.org/tsg_ran/WG4_Radio/TSGR4_93/Docs/R4-1914980.zip Radio R4-1914980. docx [retrieved on Nov. 8, 2019] section 2.3.

* cited by examiner

PATH LOSS REFERENCE SIGNAL READY TIME FOR A DOWNLINK CONTROL INFORMATION BASED ACTIVATION COMMAND

CROSS-REFERENCE TO RELATED APPLICATION

This Patent Application claims priority to U.S. Provisional Patent Application No. 62/948,061, filed on Dec. 13, 2019, entitled "PATH LOSS REFERENCE SIGNAL READY TIME FOR A DOWNLINK CONTROL INFORMATION BASED ACTIVATION COMMAND," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for path loss reference signal (PLRS) ready time for a downlink control information (DCI) based PLRS activation command.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a user equipment (UE), may include determining a path loss reference signal (PLRS) ready time that indicates an interval after which a PLRS is to be ready for use in performing an uplink power control operation, wherein the PLRS is activated by a downlink control information (DCI) based PLRS activation command; and performing the uplink power control operation, based at least in part on the PLRS, after the PLRS ready time.

In some aspects, a UE for wireless communication may include memory and one or more processors operatively coupled to the memory. The memory and the one or more processors may be configured to determine a PLRS ready time that indicates an interval after which a PLRS is to be ready for use in performing an uplink power control operation, wherein the PLRS is activated by a DCI based PLRS activation command; and perform the uplink power control operation, based at least in part on the PLRS, after the PLRS ready time.

In some aspects, a non-transitory computer-readable medium may store one or more instructions for wireless communication. The one or more instructions, when executed by one or more processors of a UE, may cause the one or more processors to: determine a PLRS ready time that indicates an interval after which a PLRS is to be ready for use in performing an uplink power control operation, wherein the PLRS is activated by a DCI based PLRS activation command; and perform the uplink power control operation, based at least in part on the PLRS, after the PLRS ready time.

In some aspects, an apparatus for wireless communication may include means for determining a PLRS ready time that indicates an interval after which a PLRS is to be ready for use in performing an uplink power control operation, wherein the PLRS is activated by a DCI based PLRS activation command; and means for performing the uplink power control operation, based at least in part on the PLRS, after the PLRS ready time.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
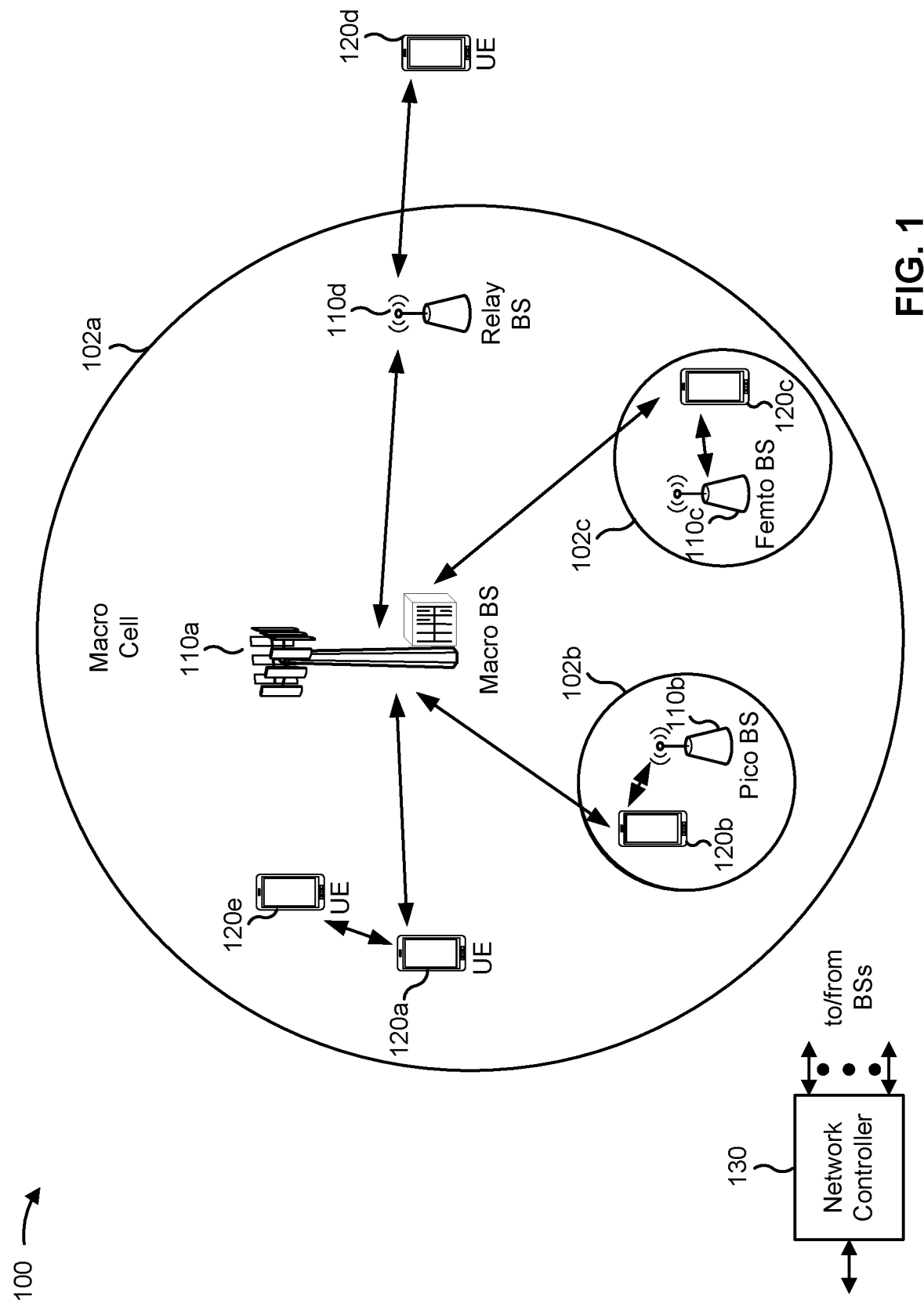
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay base station 110d may communicate with macro BS 110a and a UE 120d in order to facilitate communication between BS 110a and UE 120d. A relay base station may also be referred to as a relay BS, a relay station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
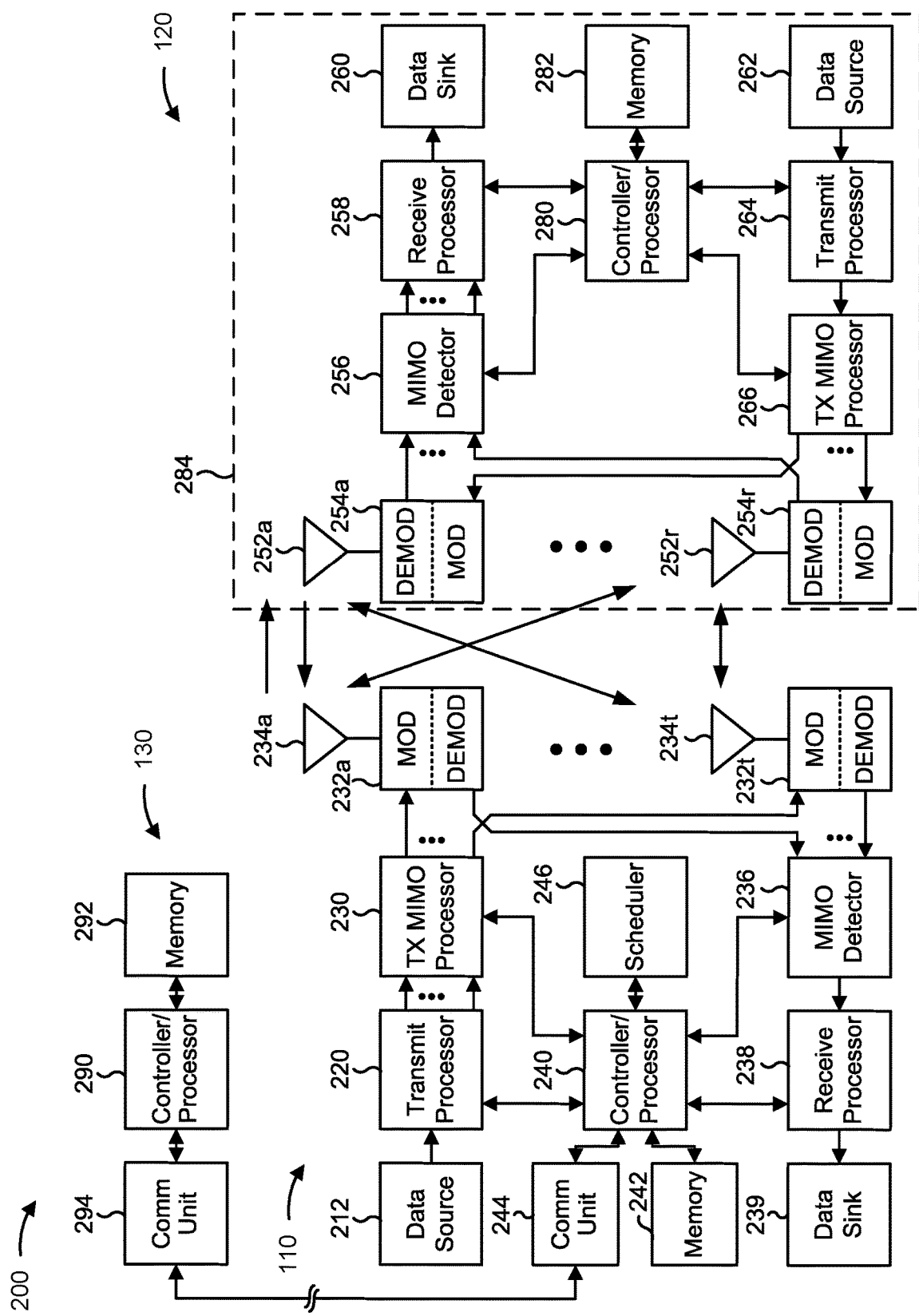
FIG. 2 is a diagram illustrating an example of a base station in communication with a UE in a wireless communication network, in accordance with various aspects of the present disclosure.

FIG. 2 shows a diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with path loss reference signal (PLRS) ready time for a downlink control information (DCI) based PLRS activation command, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for determining a PLRS ready time that indicates an interval after which a PLRS is to be ready for use in performing an uplink power control operation, wherein the PLRS is activated by a DCI based PLRS activation command, means for performing the uplink power control operation, based at least in part on the PLRS, after the PLRS ready time, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting DCI that includes an activation command for a PLRS, means for determining a PLRS ready time that indicates an interval after which the PLRS is to be ready for use by a UE in performing an uplink power control operation, and/or the like. In some aspects, such means may include one or more components of the base station 110 described in connection with FIG. 2, such as transmit processor 220, TX MIMO processor 230, modulator 232, antenna 234, DEMOD 232, MIMO detector 236, receive processor 238, controller/processor 240, memory 242, scheduler 246, and/or the like.

As indicated above, FIG. 2 is provided as an example. Other examples may differ from what is described with regard to FIG. 2.

Figure 3A:
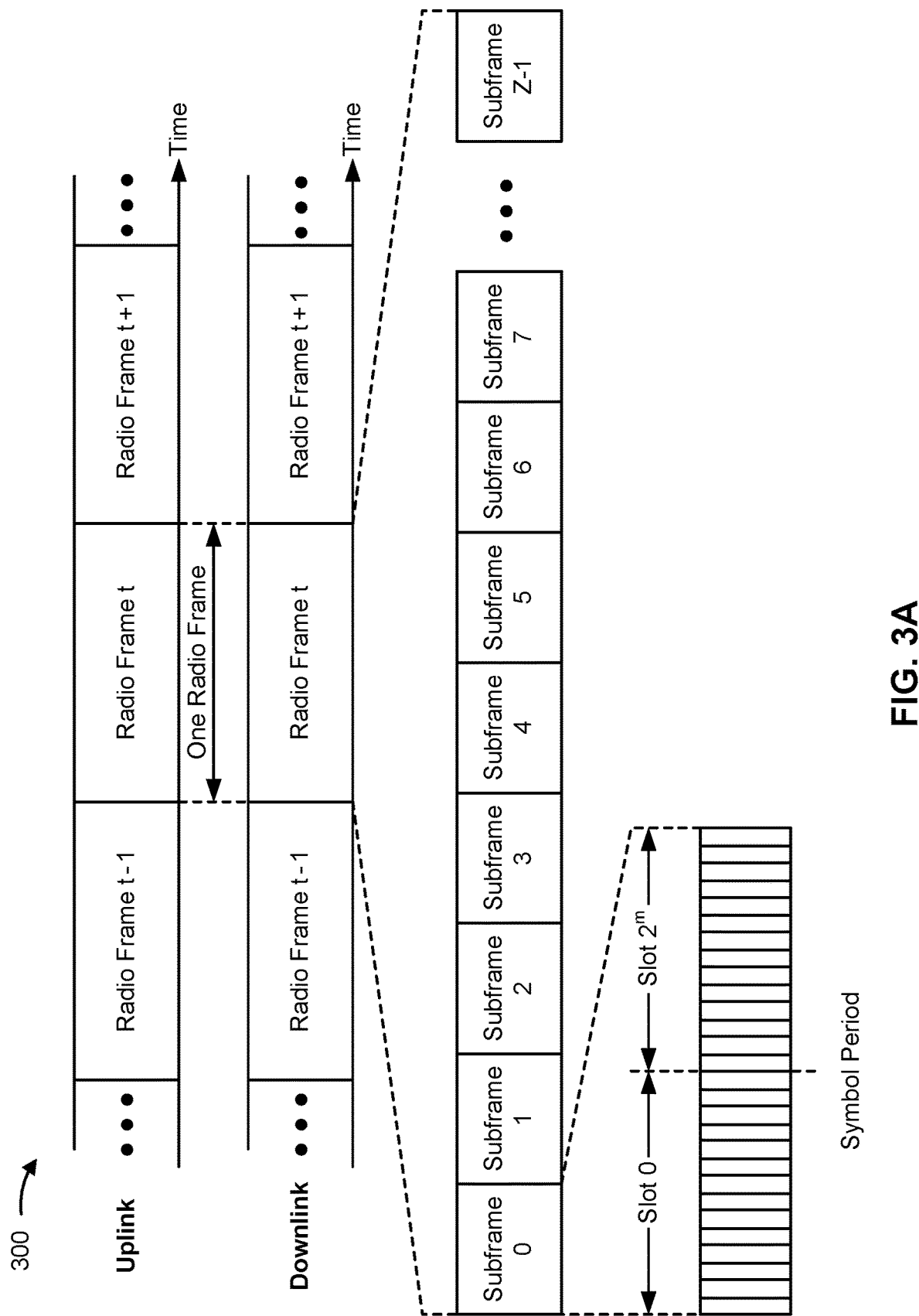
FIG. 3A is a diagram illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
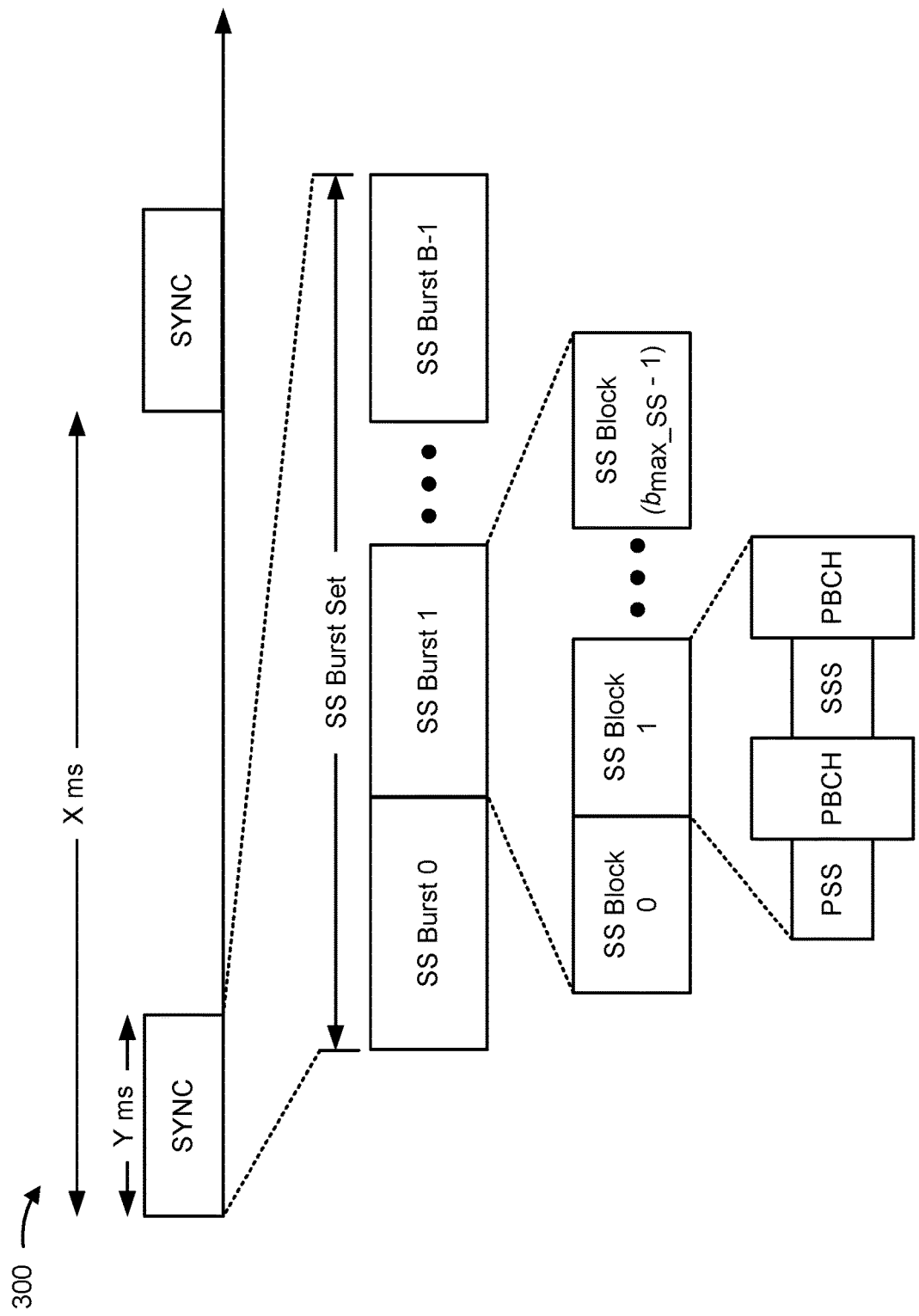
FIG. 3B is a diagram illustrating an example synchronization communication hierarchy in a wireless communication network, in accordance with various aspects of the present disclosure.

FIG. 3B is a diagram illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

A UE may receive a PLRS from a BS in connection with an uplink power control operation of the UE. For example, the UE may perform measurement of the PLRS in order to determine a path loss of a channel with the BS, and may determine an adjustment to a transmit power that is to be used by the UE for an uplink communication based at least in part on the determined path loss.

In some wireless communication systems, the BS may transmit, via a medium access control control element (MAC-CE), a PLRS activation command that indicates a PLRS that the UE is to receive (e.g., in connection with performing an uplink power control operation). However, use of a MAC-CE may introduce latency and cause delay to the UE's performance of the uplink power control operation and transmission of an associated uplink communication. In some cases, the PLRS activation command may be DCI based rather than MAC-CE based in order to reduce latency and delays. However, in some wireless communication systems, the UE may not be enabled to determine a PLRS ready time, at which the PLRS is to be ready for use in an uplink power control operation, for a PLRS activated by DCI.

Some techniques and apparatuses described herein enable a UE to determine a PLRS ready time for a PLRS activated by DCI. In this way, the UE may determine when a PLRS is to be ready for use in an uplink power control operation, and may subsequently, after the PLRS is ready, perform the uplink power control operation based at least in part on the PLRS.

Figure 4:
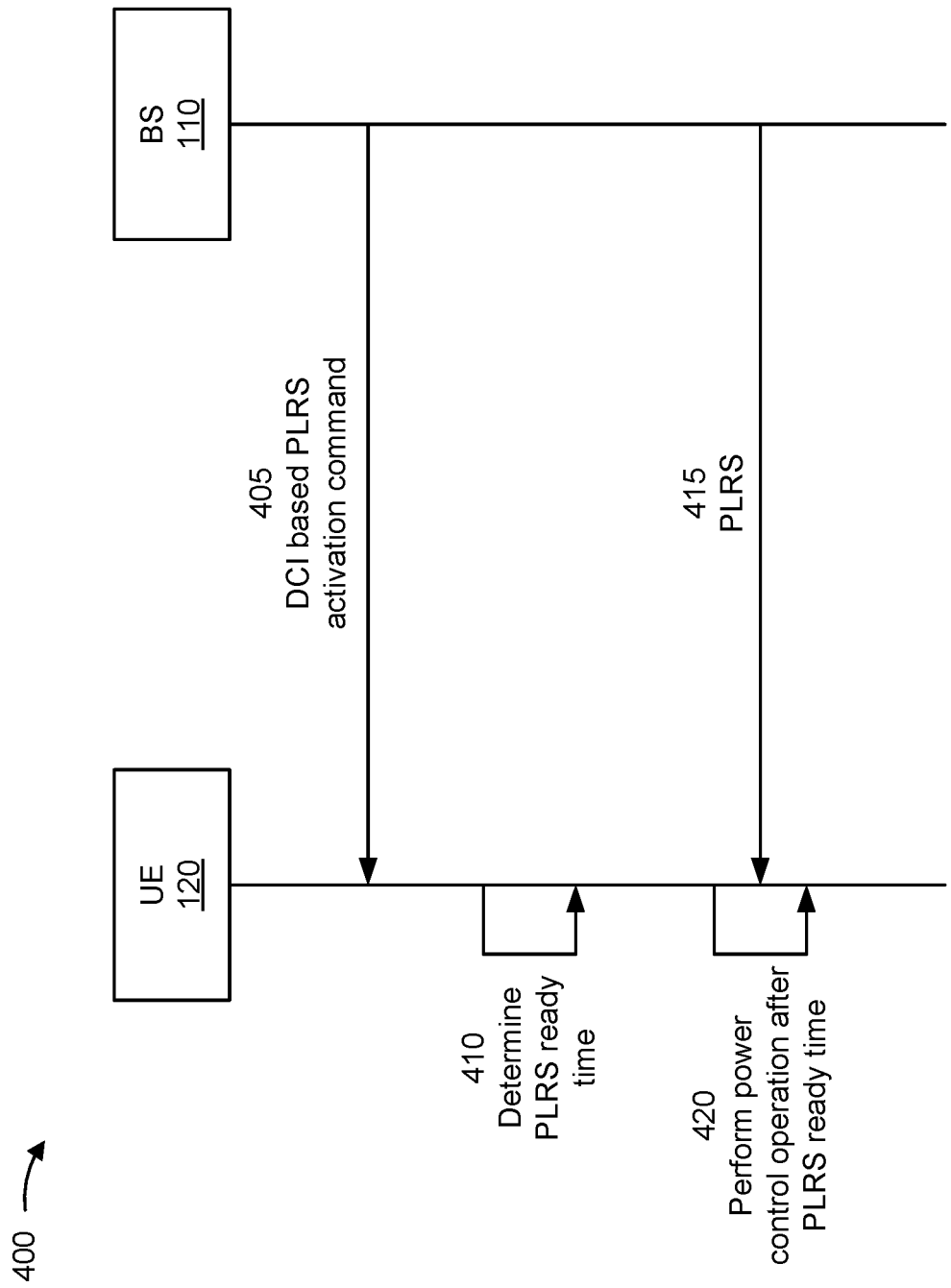
FIG. 4 is a diagram illustrating an example of PLRS ready time for a DCI based PLRS activation command, in accordance with various aspects of the present disclosure.

FIG. 4 is a diagram illustrating an example 400 of PLRS ready time for a DCI based PLRS activation command, in accordance with various aspects of the present disclosure. As shown in FIG. 4, a UE 120 may communicate with a BS 110 in connection with a PLRS. In some aspects, the PLRS may be associated with an uplink communication of the UE 120, such as a physical uplink control channel (PUCCH) communication, a physical uplink shared channel (PUSCH) communication, or a sounding reference signal (SRS) of the UE 120. For example, the PLRS may be associated with a beam that the UE 120 is to use for the uplink communication. In some aspects, the PLRS may be used by the UE 120 to perform an uplink power control operation for determining a transmit power that is to be used by the UE 120 for the uplink communication.

As shown in FIG. 4, and by reference number 405, the BS 110 may transmit, and the UE 120 may receive, a DCI based PLRS activation command. That is, the BS 110 may transmit DCI that indicates a PLRS (e.g., by a PLRS identifier) that is to be received by the UE 120. In some aspects, the DCI also may indicate a resource in which the UE 120 is to receive the PLRS, a beam that the UE 120 is to use for receiving the PLRS, and/or the like.

The PLRS indicated by the DCI based PLRS activation command may be a new PLRS for the UE 120. For example, the DCI based PLRS activation command may cause the UE 120 to switch from a previous (or current) PLRS to the new PLRS for use in performing a power control operation.

As shown by reference number 410, the UE 120 may determine a PLRS ready time for the indicated PLRS based at least in part on receiving the DCI based PLRS activation command. The PLRS ready time may indicate a time at which the PLRS is to be ready for use in performing an uplink power control operation. For example, the PLRS ready time may indicate an interval after which the PLRS is to be ready for use in performing an uplink power control operation. In some aspects, the interval may be a quantity of samples of the PLRS or a time interval. In some aspects, the BS 110 may determine the PLRS ready time that is to be used by the UE 120 in a manner similar to that described herein for the UE 120.

In some aspects, the UE 120 may determine the PLRS ready time based at least in part on a determination of whether the PLRS is known to the UE 120 or unknown to the UE 120. For example, the PLRS ready time may be a longer interval when the PLRS is unknown to the UE 120 and may be a shorter interval when the PLRS is known to the UE 120.

In some aspects, the UE 120 may determine that the PLRS is known to the UE 120 when the DCI based PLRS activation command is received by the UE 120 within a particular time period, and the PLRS, or a quasi co-located source synchronization signal block (SSB), is also detected by the UE 120 within the particular time period. Otherwise, in some aspects, the UE 120 may determine that the PLRS is unknown.

The UE 120 may determine the PLRS ready time (e.g., a quantity of samples or a time interval) based at least in part on one or more parameters (e.g., as a function of any combination of the parameters). For example, the UE 120 may determine the PLRS ready time for a known PLRS according to a first combination of one or more of the parameters, and determine the PLRS ready time for an unknown PLRS according to a second combination of one or more of the parameters.

In some aspects, a parameter may be $T_{HARQ}$, which represents a timing between a downlink transmission (e.g., a data transmission or a control transmission) and hybrid automatic repeat request (HARQ) acknowledgment feedback for the downlink transmission. In some aspects, a parameter may be $T_{first-SSB}$, which represents a time to a first SSB transmission after a MAC-CE command (e.g., that configures communication of the SSB) is decoded by the UE 120. In some aspects, a parameter may be $T_{SSB-proc}$, which represents an SSB processing time (e.g., 2 ms) by the UE 120. In some aspects, a parameter may be $T_{L1-RSRP}$, which represents a time for a layer 1 (L1) RSRP measurement for receive beam refinement by the UE 120.

In some aspects, a parameter may be Tok, which may represent whether the PLRS is active for the UE 120 (e.g., Tok may have a value of 1 when the PLRS is active or a value of 0 when the PLRS is not active). In some aspects, a parameter may be $T_{Ouk}$, which may represent whether the L1 RSRP measurement is based on a channel state information reference signal (CSI-RS) or an SSB (e.g., $T_{Ouk}$ may have a value of 1 when the L1 RSRP measurement is CSI-RS based or a value of 0 when the L1 RSRP measurement is SSB based). In some aspects, a parameter may be a numerology for a component carrier associated with the DCI based PLRS activation command, or a numerology for a component carrier associated with the PLRS.

In some aspects, such as when the ready time indicates a time interval, the time interval may begin after the UE 120 receives the DCI based PLRS activation command (e.g., the time interval may be from an end of the DCI based PLRS activation command). When the BS 110 uses physical downlink control channel (PDCCH) repetition to transmit the DCI based PLRS activation command, the time interval may begin after the UE 120 receives a particular PDCCH repetition of the DCI based PLRS activation command. For example, the particular PDCCH repetition may be a first transmission of a PDCCH including the DCI based PLRS activation command, or a last transmission of a PDCCH including the DCI based PLRS activation command. As another example, the particular PDCCH repetition may be other than the first transmission or the last transmission (e.g., the particular PDCCH repetition may be an intermediate transmission). In such a case, the BS 110 may transmit, and the UE 120 may receive, an indication of the particular PDCCH repetition that is to be used for beginning the time interval (e.g., via at least one of radio resource control (RRC) signaling, a MAC-CE, or DCI).

In some aspects, such as when the ready time indicates a time interval, the time interval may begin after the UE 120 transmits acknowledgment feedback for the DCI based PLRS activation command (e.g., the time interval may be from an end of the acknowledgment feedback). When the UE 120 uses uplink repetition (e.g., PUCCH repetition) to transmit the acknowledgment feedback, the time interval may begin after the UE 120 transmits a particular uplink repetition of the acknowledgment feedback. For example, the particular uplink repetition may be a first transmission of an uplink communication including the acknowledgment feedback, or a last transmission of an uplink communication including the acknowledgment feedback. As another example, the particular uplink repetition may be other than the first transmission or the last transmission (e.g., the particular uplink repetition may be an intermediate transmission). In such a case, the BS 110 may transmit, and the UE 120 may receive, an indication of the particular uplink repetition that is to be used for beginning the time interval (e.g., via at least one of RRC signaling, a MAC-CE, or DCI).

As shown by reference number 415, the BS 110 may transmit, and the UE 120 may receive, the PLRS. For example, the UE 120 may receive the PLRS in accordance with the DCI based PLRS activation command. In some aspects, the UE 120 may determine that the PLRS is ready for use in performing an uplink power control operation based at least in part on a determination that the determined PLRS ready time is satisfied. For example, in cases in which the PLRS ready time is a quantity of samples, the UE 120 may determine that the PLRS is ready for use in performing an uplink power control operation based at least in part on a determination that the UE 120 has taken the quantity of samples of the PLRS, or that a time corresponding to the quantity of samples has expired. As another example, in cases in which the PLRS ready time is a time interval, the UE 120 may determine that that the PLRS is ready for use in performing an uplink power control operation based at least in part on a determination that the time interval has expired.

As shown by reference number 420, the UE 120 may perform an uplink power control operation, based at least in part on the PLRS, after the PLRS ready time. For example, after determining that the PLRS is ready for use in performing an uplink power control operation, as described above, the UE 120 may perform the uplink power control operation using the PLRS. In some aspects, the UE 120, according to the uplink power control operation, may determine a path loss of a channel between the UE 120 and the BS 110 based at least in part on the PLRS. For example, the UE 120 may determine an RSRP of the PLRS, and compare the RSRP to a power at which the PLRS was transmitted in order to determine the path loss. The UE 120 may determine, according to the uplink power control operation, a transmit power for transmitting an uplink communication (e.g., a PUCCH, a PUSCH, and/or an SRS) based at least in part on the determined path loss, and may transmit the uplink communication according to the transmit power. In some aspects, the UE 120 may transmit, and the BS 110 may receive, after the PLRS ready time, the uplink communication using the transmit power.

As indicated above, FIG. 4 is provided as an example. Other examples may differ from what is described with respect to FIG. 4.

Figure 5:
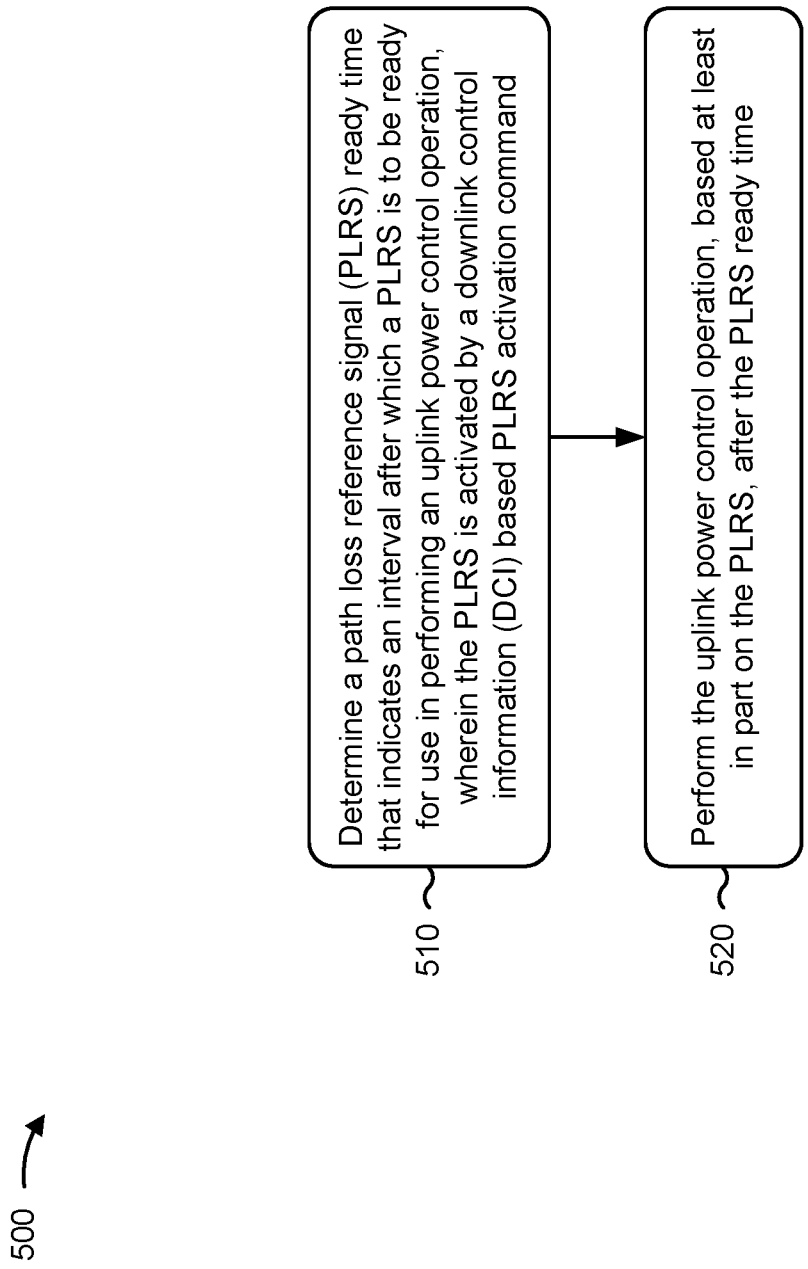
FIGS. 5-6 are diagrams illustrating example processes associated with PLRS ready time for a DCI based PLRS activation command, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120, and/or the like) performs operations associated with PLRS ready time for a DCI based activation command.

As shown in FIG. 5, in some aspects, process 500 may include determining a PLRS ready time that indicates an interval after which a PLRS is to be ready for use in performing an uplink power control operation, wherein the PLRS is activated by a DCI based PLRS activation command (block 510). For example, the UE (e.g., using controller/processor 280, and/or the like) may determine a PLRS ready time that indicates an interval after which a PLRS is to be ready for use in performing an uplink power control operation, as described above. In some aspects, the PLRS is activated by a DCI based PLRS activation command.

As further shown in FIG. 5, in some aspects, process 500 may include performing the uplink power control operation, based at least in part on the PLRS, after the PLRS ready time (block 520). For example, the UE (e.g., using antenna 252, DEMOD 254, MIMO detector 256, receive processor 258, controller/processor 280, and/or the like) may perform the uplink power control operation, based at least in part on the PLRS, after the PLRS ready time, as described above.

Process 500 may include additional aspects, such as any single aspect or any combination of aspects described below and/or in connection with one or more other processes described elsewhere herein.

In a first aspect, the PLRS ready time is determined based at least in part on a determination of whether the PLRS is known to the UE or unknown to the UE. In a second aspect, alone or in combination with the first aspect, the PLRS is determined to be known to the UE when the DCI based PLRS activation command has been received within a particular time period, and the PLRS, or a quasi co-located source SSB, has been detected within the particular time period.

In a third aspect, alone or in combination with one or more of the first and second aspects, the PLRS ready time is determined based at least in part on at least one of a timing between a downlink transmission and acknowledgment feedback for the downlink transmission, a time to a first SSB transmission after a MAC-CE command is decoded, an SSB processing time, a time for an L1 RSRP measurement for receive beam refinement, whether the PLRS is active for the UE, whether the L1 RSRP measurement is based on a CSI-RS or an SSB, or a numerology for at least one of a component carrier associated with the DCI based PLRS activation command or a component carrier associated with the PLRS.

In a fourth aspect, alone or in combination with one or more of the first through third aspects, the interval is a quantity of samples of the PLRS or a time interval.

In a fifth aspect, alone or in combination with one or more of the first through fourth aspects, the time interval begins after reception of the DCI based PLRS activation command.

In a sixth aspect, alone or in combination with one or more of the first through fifth aspects, when PDCCH repetition is used in association with communicating the DCI based PLRS activation command, the time interval begins after reception of a particular PDCCH repetition. In a seventh aspect, alone or in combination with one or more of the first through sixth aspects, the particular PDCCH repetition is a first transmission of a PDCCH including the DCI based PLRS activation command, an intermediate transmission of a PDCCH including the DCI based PLRS activation command, or a last transmission of a PDCCH including the DCI based PLRS activation command. In an eighth aspect, alone or in combination with one or more of the first through seventh aspects, the particular PDCCH repetition is indicated via at least one of RRC signaling, a MAC-CE, or DCI.

In a ninth aspect, alone or in combination with one or more of the first through eighth aspects, the time interval begins after transmission of acknowledgement feedback for the DCI based PLRS activation command.

In a tenth aspect, alone or in combination with one or more of the first through ninth aspects, when uplink repetition is used in association with transmitting the acknowledgment feedback, the time interval begins after transmission of a particular uplink repetition. In an eleventh aspect, alone or in combination with one or more of the first through tenth aspects, the particular uplink repetition is a first transmission of an uplink communication including the acknowledgment feedback, an intermediate transmissions of an uplink communication including the acknowledgment feedback, or a last transmission of an uplink communication including the acknowledgment feedback. In a twelfth aspect, alone or in combination with one or more of the first through eleventh aspects, the particular uplink repetition is indicated via at least one of RRC signaling, a MAC-CE, or DCI.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
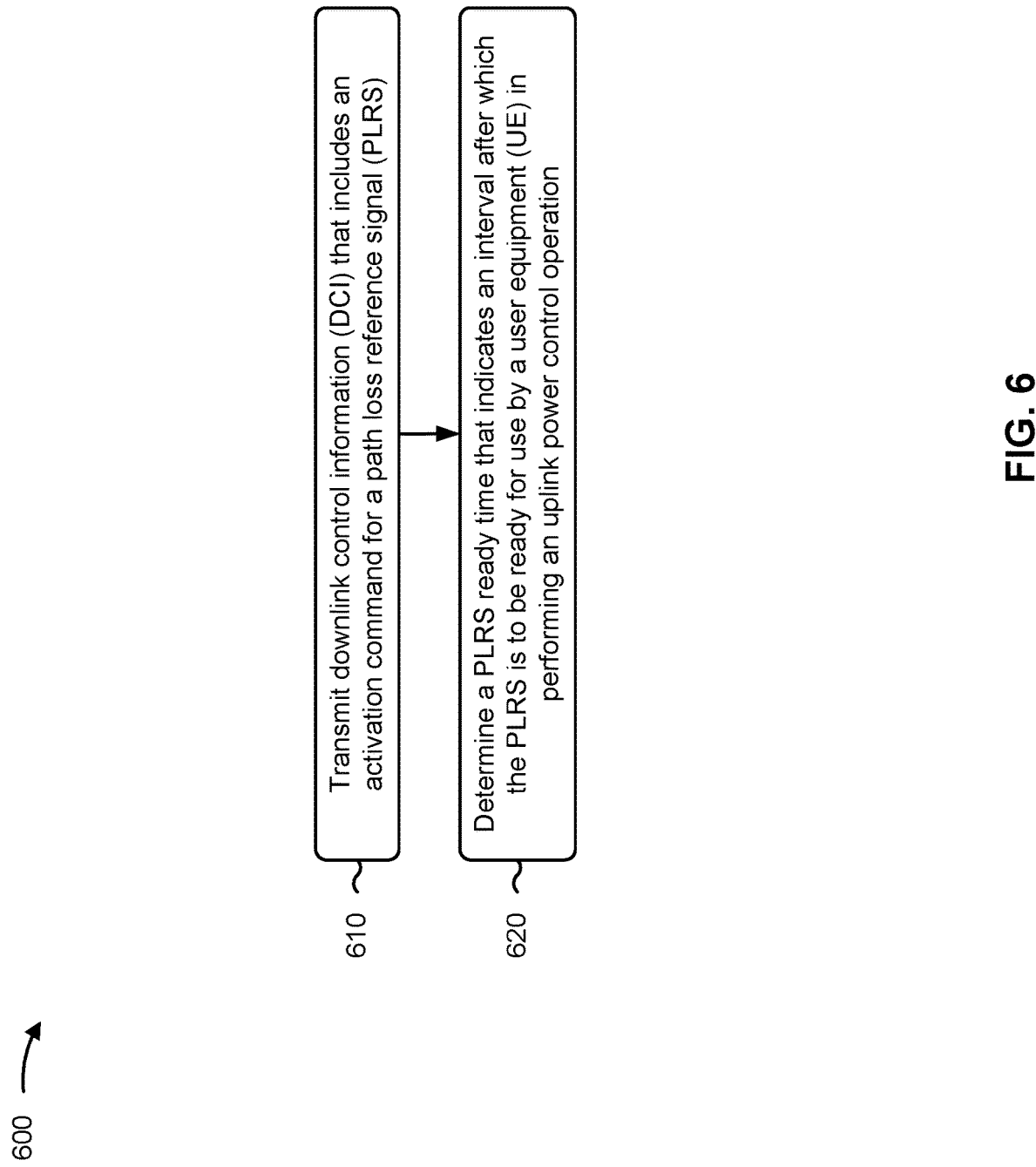

FIG. 6 is a diagram illustrating an example process 600 performed, for example, by a base station, in accordance with various aspects of the present disclosure. Example process 600 is an example where the base station (e.g., base station 110) performs operations associated with PLRS ready time for a DCI based activation command.

As shown in FIG. 6, in some aspects, process 600 may include transmitting DCI that includes an activation command for a PLRS (block 610). For example, the base station (e.g., using transmit processor 220, TX MIMO processor 230, modulator 232, antenna 234, controller/processor 240, and/or memory 242) may transmit DCI that includes an activation command for a PLRS, as described above.

As further shown in FIG. 6, in some aspects, process 600 may include determining a PLRS ready time that indicates an interval after which the PLRS is to be ready for use by a UE in performing an uplink power control operation (block 620). For example, the base station (e.g., using controller/processor 240 and/or memory 242) may determine a PLRS ready time that indicates an interval after which the PLRS is to be ready for use by a UE in performing an uplink power control operation, as described above.

Process 600 may include additional aspects, such as any single aspect or any combination of aspects described below and/or in connection with one or more other processes described elsewhere herein.

In a first aspect, the PLRS ready time is determined based at least in part on a determination of whether the PLRS is known to the UE or unknown to the UE.

In a second aspect, alone or in combination with the first aspect, the PLRS is determined to be known to the UE when the DCI that includes the activation command for the PLRS has been received by the UE within a particular time period, and the PLRS, or a quasi co-located source SSB, has been detected by the UE within the particular time period.

In a third aspect, alone or in combination with one or more of the first and second aspects, the PLRS ready time is determined based at least in part on at least one of a timing between a downlink transmission and acknowledgment feedback for the downlink transmission, a time to a first SSB transmission after a MAC-CE command is decoded, an SSB processing time of the UE, a time for a layer 1 RSRP measurement for receive beam refinement, whether the PLRS is active for the UE, whether the layer 1 RSRP measurement is based on a channel state information reference signal or an SSB, or a numerology for at least one of a component carrier associated with the DCI or a component carrier associated with the PLRS.

In a fourth aspect, alone or in combination with one or more of the first through third aspects, the interval is a quantity of samples of the PLRS or a time interval.

In a fifth aspect, alone or in combination with one or more of the first through fourth aspects, the time interval begins after the UE receives the DCI that includes the activation command for the PLRS.

In a sixth aspect, alone or in combination with one or more of the first through fifth aspects, when PDCCH repetition is used in association with transmitting the DCI that includes the activation command for the PLRS, the time interval begins after the UE receives a particular PDCCH repetition.

In a seventh aspect, alone or in combination with one or more of the first through sixth aspects, the particular PDCCH repetition is a first transmission of a PDCCH including the DCI, an intermediate transmission of a PDCCH including the DCI, or a last transmission of a PDCCH including the DCI.

In an eighth aspect, alone or in combination with one or more of the first through seventh aspects, the particular PDCCH repetition is indicated via at least one of RRC signaling, a MAC-CE, or DCI.

In a ninth aspect, alone or in combination with one or more of the first through eighth aspects, the time interval begins after the UE transmits acknowledgement feedback for the DCI that includes the activation command for the PLRS.

In a tenth aspect, alone or in combination with one or more of the first through ninth aspects, when uplink repetition is used in association with transmitting the acknowledgment feedback, the time interval begins after the UE transmits a particular uplink repetition.

In an eleventh aspect, alone or in combination with one or more of the first through tenth aspects, the particular uplink repetition is a first transmission of an uplink communication including the acknowledgment feedback, an intermediate transmissions of an uplink communication including the acknowledgment feedback, or a last transmission of an uplink communication including the acknowledgment feedback.

In a twelfth aspect, alone or in combination with one or more of the first through eleventh aspects, the particular uplink repetition is indicated via at least one of RRC signaling, a MAC-CE, or DCI.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
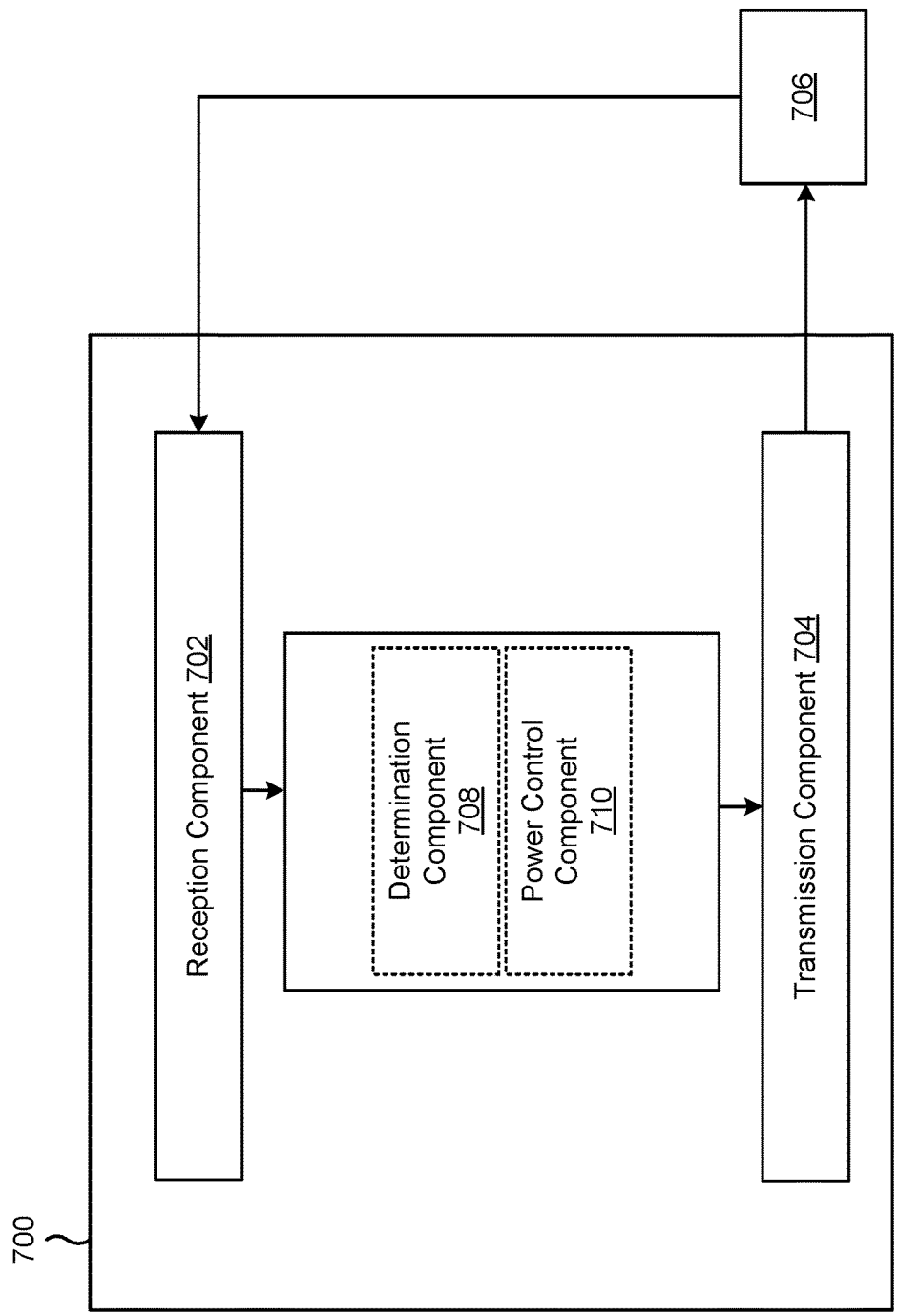
FIGS. 7-8 are diagrams illustrating example apparatuses for wireless communication, in accordance with various aspects of the present disclosure.

FIG. 7 is a diagram illustrating an example apparatus 700 for wireless communication, in accordance with various aspects of the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708 or a power control component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The determination component 708 may determine a PLRS ready time that indicates an interval after which a PLRS is to be ready for use in performing an uplink power control operation. In some aspects, the PLRS is activated by a DCI based PLRS activation command. The power control component 710 may perform the uplink power control operation, based at least in part on the PLRS, after the PLRS ready time.

The quantity and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
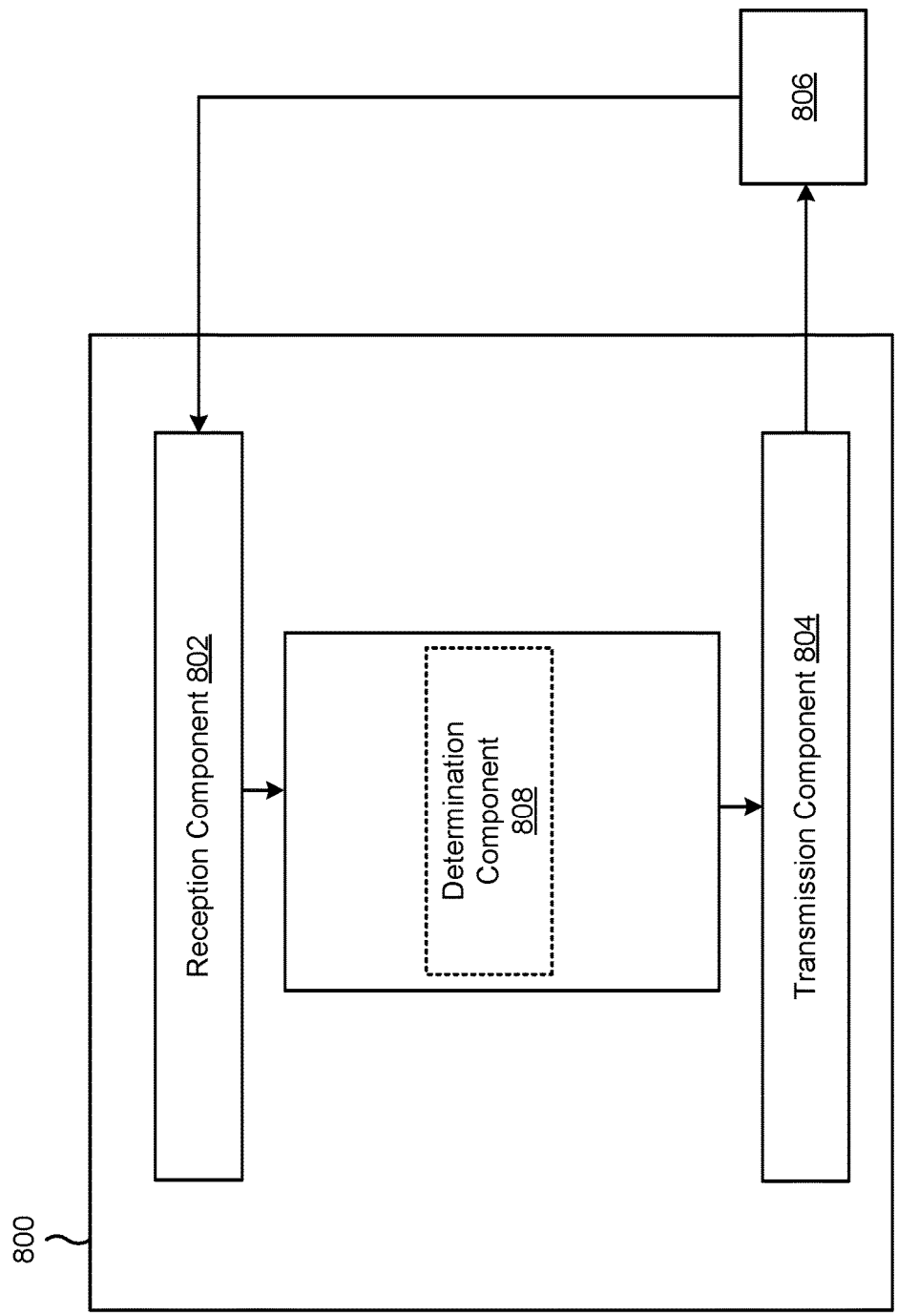

FIG. 8 is a diagram illustrating an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit DCI that includes an activation command for a PLRS. The determination component 808 may determine a PLRS ready time that indicates an interval after which the PLRS is to be ready for use by a UE in performing an uplink power control operation.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of aspects of the present disclosure:

Aspect 1: A method of wireless communication performed by a UE, comprising: determining a PLRS ready time that indicates an interval after which a PLRS is to be ready for use in performing an uplink power control operation, wherein the PLRS is activated by a DCI based PLRS activation command; and performing the uplink power control operation, based at least in part on the PLRS, after the PLRS ready time.

Aspect 2: The method of aspect 1, wherein the PLRS ready time is determined based at least in part on a determination of whether the PLRS is known to the UE or unknown to the UE.

Aspect 3: The method of any of aspects 1 through 2, wherein the PLRS is determined to be known to the UE when: the DCI based PLRS activation command has been received within a particular time period; and the PLRS, or a quasi co-located source SSB, has been detected within the particular time period.

Aspect 4: The method of any of aspects 1 through 3, wherein the PLRS ready time is determined based at least in part on at least one of: a timing between a downlink transmission and acknowledgment feedback for the downlink transmission; a time to a first SSB transmission after a MAC-CE command is decoded; an SSB processing time; a time for a layer 1 RSRP measurement for receive beam refinement; whether the PLRS is active for the UE; whether the layer 1 RSRP measurement is based on a channel state information reference signal or an SSB; or a numerology for at least one of a component carrier associated with the DCI based PLRS activation command or a component carrier associated with the PLRS.

Aspect 5: The method of any of aspects 1 through 4, wherein the interval is a quantity of samples of the PLRS or a time interval.

Aspect 6: The method of aspect 5, wherein the time interval begins after reception of the DCI based PLRS activation command.

Aspect 7: The method of aspect 6, wherein, when PDCCH repetition is used in association with communicating the DCI based PLRS activation command, the time interval begins after reception of a particular PDCCH repetition.

Aspect 8: The method of aspect 7, wherein the particular PDCCH repetition is a first transmission of a PDCCH including the DCI based PLRS activation command, an intermediate transmission of a PDCCH including the DCI based PLRS activation command, or a last transmission of a PDCCH including the DCI based PLRS activation command.

Aspect 9: The method of any of aspects 7 through 8, wherein the particular PDCCH repetition is indicated via at least one of RRC signaling, a MAC-CE, or DCI.

Aspect 10: The method of aspect 5, wherein the time interval begins after transmission of acknowledgement feedback for the DCI based PLRS activation command.

Aspect 11: The method of aspect 10, wherein, when uplink repetition is used in association with transmitting the acknowledgment feedback, the time interval begins after transmission of a particular uplink repetition.

Aspect 12: The method of aspect 11, wherein the particular uplink repetition is a first transmission of an uplink communication including the acknowledgment feedback, an intermediate transmissions of an uplink communication including the acknowledgment feedback, or a last transmission of an uplink communication including the acknowledgment feedback.

Aspect 13: The method of any of aspects 11 through 12, wherein the particular uplink repetition is indicated via at least one of RRC signaling, a MAC-CE, or DCI.

Aspect 14: An apparatus for wireless communication at a device, comprising a processor; memory coupled with the processor; and instructions stored in the memory and executable by the processor to cause the apparatus to perform the method of one or more aspects of aspects 1-13.

Aspect 15: A device for wireless communication, comprising a memory and one or more processors coupled to the memory, the memory and the one or more processors configured to perform the method of one or more aspects of aspects 1-13.

Aspect 16: An apparatus for wireless communication, comprising at least one means for performing the method of one or more aspects of aspects 1-13.

Aspect 17: A non-transitory computer-readable medium storing code for wireless communication, the code comprising instructions executable by a processor to perform the method of one or more aspects of aspects 1-13.

Aspect 18: A non-transitory computer-readable medium storing a set of instructions for wireless communication, the set of instructions comprising one or more instructions that, when executed by one or more processors of a device, cause the device to perform the method of one or more aspects of aspects 1-13.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining a path loss reference signal (PLRS) ready time that indicates an interval after which a PLRS is to be ready for use in performing an uplink power control operation, wherein the PLRS is activated by a downlink control information (DCI) based PLRS activation command,
wherein the interval is a quantity of samples of the PLRS or a time interval, and
wherein the interval begins after transmission of acknowledgement feedback for the DCI based PLRS activation command; and
performing the uplink power control operation, based at least in part on the PLRS, after the PLRS ready time.

2. The method of claim 1, wherein the PLRS ready time is determined based at least in part on a determination of whether the PLRS is known to the UE or unknown to the UE.

3. The method of claim 2, wherein the PLRS is determined to be known to the UE when:
the DCI based PLRS activation command has been received within a particular time period; and
the PLRS, or a quasi co-located source synchronization signal block, has been detected within the particular time period.

4. The method of claim 1, wherein the PLRS ready time is determined based at least in part on at least one of:
a timing between a downlink transmission and the acknowledgment feedback for the downlink transmission;
a time to a first synchronization signal block (SSB) transmission after a medium access control control element command is decoded;
an SSB processing time;
a time for a layer 1 reference signal received power (RSRP) measurement for receive beam refinement;
whether the PLRS is active for the UE;
whether the layer 1 RSRP measurement is based on a channel state information reference signal or an SSB; or
a numerology for at least one of a component carrier associated with the DCI based PLRS activation command or a component carrier associated with the PLRS.

5. The method of claim 1, wherein the time interval begins after reception of the DCI based PLRS activation command.

6. The method of claim 5, wherein, when physical downlink control channel (PDCCH) repetition is used in association with communicating the DCI based PLRS activation command, the time interval begins after reception of a particular PDCCH repetition.

7. The method of claim 6, wherein the particular PDCCH repetition is a first transmission of a PDCCH including the DCI based PLRS activation command, an intermediate transmission of a PDCCH including the DCI based PLRS activation command, or a last transmission of a PDCCH including the DCI based PLRS activation command.

8. The method of claim 6, wherein the particular PDCCH repetition is indicated via at least one of radio resource control signaling, a medium access control control element, or DCI.

9. The method of claim 1, wherein, when uplink repetition is used in association with transmitting the acknowledgment feedback, the time interval begins after transmission of a particular uplink repetition.

10. The method of claim 9, wherein the particular uplink repetition is a first transmission of an uplink communication including the acknowledgment feedback, an intermediate transmissions of an uplink communication including the acknowledgment feedback, or a last transmission of an uplink communication including the acknowledgment feedback.

11. The method of claim 9, wherein the particular uplink repetition is indicated via at least one of radio resource control signaling, a medium access control control element, or DCI.

12. A user equipment (UE) for wireless communication, comprising:
a memory; and
one or more processors operatively coupled to the memory, the memory and the one or more processors configured to:
determine a path loss reference signal (PLRS) ready time that indicates an interval after which a PLRS is to be ready for use in performing an uplink power control operation,
wherein the PLRS is activated by a downlink control information (DCI) based PLRS activation command,
wherein the interval is a quantity of samples of the PLRS or a time interval, and
wherein the interval begins after transmission of acknowledgement feedback for the DCI based PLRS activation command; and
perform the uplink power control operation, based at least in part on the PLRS, after the PLRS ready time.

13. The UE of claim 12, wherein the PLRS ready time is determined based at least in part on a determination of whether the PLRS is known to the UE or unknown to the UE.

14. The UE of claim 13, wherein the PLRS is determined to be known to the UE when:
the DCI based PLRS activation command has been received within a particular time period; and
the PLRS, or a quasi co-located source synchronization signal block, has been detected within the particular time period.

15. The UE of claim 12, wherein the PLRS ready time is determined based at least in part on at least one of:
a timing between a downlink transmission and the acknowledgment feedback for the downlink transmission;
a time to a first synchronization signal block (SSB) transmission after a medium access control control element command is decoded;
an SSB processing time;
a time for a layer 1 reference signal received power (RSRP) measurement for receive beam refinement;
whether the PLRS is active for the UE;
whether the layer 1 RSRP measurement is based on a channel state information reference signal or an SSB; or
a numerology for at least one of a component carrier associated with the DCI based PLRS activation command or a component carrier associated with the PLRS.

16. The UE of claim 12, wherein the time interval begins after reception of the DCI based PLRS activation command.

17. The UE of claim 16, wherein, when physical downlink control channel (PDCCH) repetition is used in association with communicating the DCI based PLRS activation command, the time interval begins after reception of a particular PDCCH repetition.

18. The UE of claim 17, wherein the particular PDCCH repetition is a first transmission of a PDCCH including the DCI based PLRS activation command, an intermediate transmission of a PDCCH including the DCI based PLRS activation command, or a last transmission of a PDCCH including the DCI based PLRS activation command.

19. The UE of claim 17, wherein the particular PDCCH repetition is indicated via at least one of radio resource control signaling, a medium access control control element, or DCI.

20. The UE of claim 12, wherein, when uplink repetition is used in association with transmitting the acknowledgment feedback, the time interval begins after transmission of a particular uplink repetition.

21. The UE of claim 20, wherein the particular uplink repetition is a first transmission of an uplink communication including the acknowledgment feedback, an intermediate transmission of an uplink communication including the acknowledgment feedback, or a last transmission of an uplink communication including the acknowledgment feedback.

22. The UE of claim 20, wherein the particular uplink repetition is indicated via at least one of radio resource control signaling, a medium access control control element, or DCI.

23. A non-transitory computer-readable medium storing a set of instructions for wireless communication, the set of instructions comprising:
one or more instructions that, when executed by one or more processors of a user equipment (UE), cause the UE to:
determine a path loss reference signal (PLRS) ready time that indicates an interval after which a PLRS is to be ready for use in performing an uplink power control operation,
wherein the PLRS is activated by a downlink control information (DCI) based PLRS activation command,
wherein the interval is a quantity of samples of the PLRS or a time interval, and
wherein the interval begins after transmission of acknowledgement feedback for the DCI based PLRS activation command; and
perform the uplink power control operation, based at least in part on the PLRS, after the PLRS ready time.

24. The non-transitory computer-readable medium of claim 23, wherein the PLRS ready time is determined based at least in part on at least one of:
a timing between a downlink transmission and the acknowledgment feedback for the downlink transmission;
a time to a first synchronization signal block (SSB) transmission after a medium access control control element command is decoded;
an SSB processing time;
a time for a layer 1 reference signal received power (RSRP) measurement for receive beam refinement;
whether the PLRS is active for the UE;
whether the layer 1 RSRP measurement is based on a channel state information reference signal or an SSB; or
a numerology for at least one of a component carrier associated with the DCI based PLRS activation command or a component carrier associated with the PLRS.

25. An apparatus for wireless communication, comprising:
means for determining a path loss reference signal (PLRS) ready time that indicates an interval after which a PLRS is to be ready for use in performing an uplink power control operation,
wherein the PLRS is activated by a downlink control information (DCI) based PLRS activation command,
wherein the interval is a quantity of samples of the PLRS or a time interval, and
wherein the interval begins after transmission of acknowledgement feedback for the DCI based PLRS activation command; and
means for performing the uplink power control operation, based at least in part on the PLRS, after the PLRS ready time.

26. The apparatus of claim 25, wherein the PLRS ready time is determined based at least in part on at least one of:
a timing between a downlink transmission and the acknowledgment feedback for the downlink transmission;
a time to a first synchronization signal block (SSB) transmission after a medium access control control element command is decoded;
an SSB processing time;
a time for a layer 1 reference signal received power (RSRP) measurement for receive beam refinement;
whether the PLRS is active for the apparatus;
whether the layer 1 RSRP measurement is based on a channel state information reference signal or an SSB; or
a numerology for at least one of a component carrier associated with the DCI based PLRS activation command or a component carrier associated with the PLRS.

27. The apparatus of claim 25, wherein the PLRS ready time is determined based at least in part on a timing between a downlink transmission and the acknowledgment feedback for the downlink transmission.

28. The method of claim 1, wherein the PLRS ready time is determined based at least in part on a timing between a downlink transmission and the acknowledgment feedback for the downlink transmission.

29. The UE of claim 12, wherein the PLRS ready time is determined based at least in part on a timing between a downlink transmission and the acknowledgment feedback for the downlink transmission.

30. The non-transitory computer-readable medium of claim 23, wherein the PLRS ready time is determined based at least in part on a timing between a downlink transmission and the acknowledgment feedback for the downlink transmission.

* * * * *